(12) United States Patent
Yankov et al.

(10) Patent No.: US 8,498,950 B2
(45) Date of Patent: Jul. 30, 2013

(54) SYSTEM FOR TRAINING CLASSIFIERS IN MULTIPLE CATEGORIES THROUGH ACTIVE LEARNING

(75) Inventors: Dragomir Yankov, Sunnyvale, CA (US); Suju Rajan, Sunnyvale, CA (US); Adwait Ratnaparkhi, San Jose, CA (US); Rajesh G. Parekh, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 315 days.

(21) Appl. No.: 12/905,543

(22) Filed: Oct. 15, 2010

(65) Prior Publication Data
US 2012/0095943 A1    Apr. 19, 2012

(51) Int. Cl.
G06F 15/18    (2006.01)

(52) U.S. Cl.
USPC .......................................................... 706/12

(58) Field of Classification Search
USPC .......................................................... 706/12
See application file for complete search history.

(56) References Cited

PUBLICATIONS

Kapoor, Ashish et al "Active Learning with Gaussian Processes for Object Categorization" IEEE 2007. [Online] Downloaded Oct. 22, 2012 http://ieeexplore.ieee.org/stamp/stamp.jsp?tp=&arnumber=4408844.*
Allwein, Erin "Reducing Multiclass to Binary: A unifying Approach for Margin Classifiers" Journal of machine Learning 2000 [Online]
Downloaded Oct. 22, 2012 http://delivery.acm.org/10.1145/950000/944737/1-113-allwein.pdf?ip=151.207.246.4&acc=PUBLIC&CFID=177801667&CFTOKEN=82670341&_acm_=1350588984_7ed1c1203a0ff4c0cea31fbfc07c5942.*
Brinker, Klaus, "On Active Learning in Multi-Label Classification," From Data and Information Analysis to Knowledge Engineering: Studies in Classification, Data Analysis, and Knowledge Organization, Part 6, pp. 206-213 (2006).
Fischetti, Matteo, et al., "The feasibility pump," 104(1) Mathematical Programming 91-104 (2005).
Rousu, Juho, et al., "Kernel-Based Learning of Hierarchical Multilabel Classification Models," 7 Journal of Machine Learning Research 1601-1626 (2006).
Tong, Simon, et al., "Support Vector Machine Active Learning with Applications to Text Classification," 2 Journal of Machine Learning Research 45-66 (2002).

* cited by examiner

*Primary Examiner* — Ben Rifkin
(74) *Attorney, Agent, or Firm* — Nathan O. Greene; Brinks Hofer Gilson & Lione

(57) ABSTRACT

A system for training classifiers in multiple categories through an active learning system, including a computer having a memory and a processor, the processor programmed to: train an initial set of m binary one-versus-all classifiers, one for each category in a taxonomy, on a labeled dataset of examples stored in a database coupled with the computer; uniformly sample up to a predetermined large number of examples from a second, larger dataset of unlabeled examples stored in a database coupled with the computer; order the sampled unlabeled examples in order of informativeness for each classifier; determine a minimum subset of the unlabeled examples that are most informative for a maximum number of the classifiers to form an active set for learning; and use editorially-labeled versions of the examples of the active set to re-train the classifiers, thereby improving the accuracy of at least some of the classifiers.

17 Claims, 11 Drawing Sheets

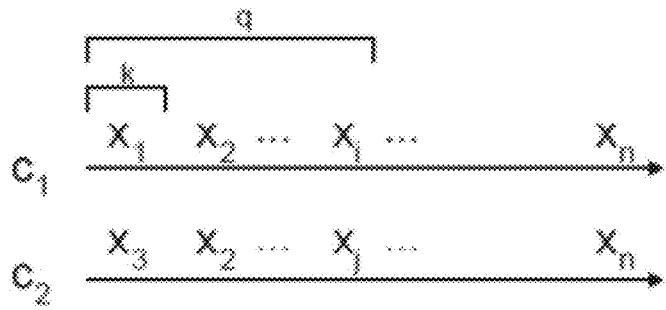
FIG. 7
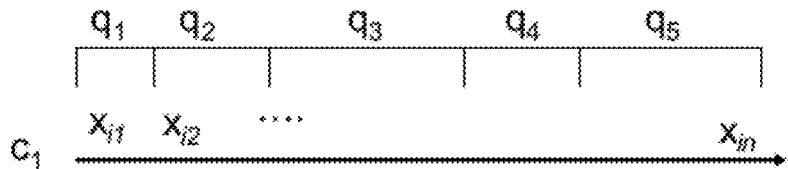
FIG. 9
$$a_{11}z_1 + a_{12}z_2 + \ldots + a_{1n}z_n \geq k$$
FIG. 10
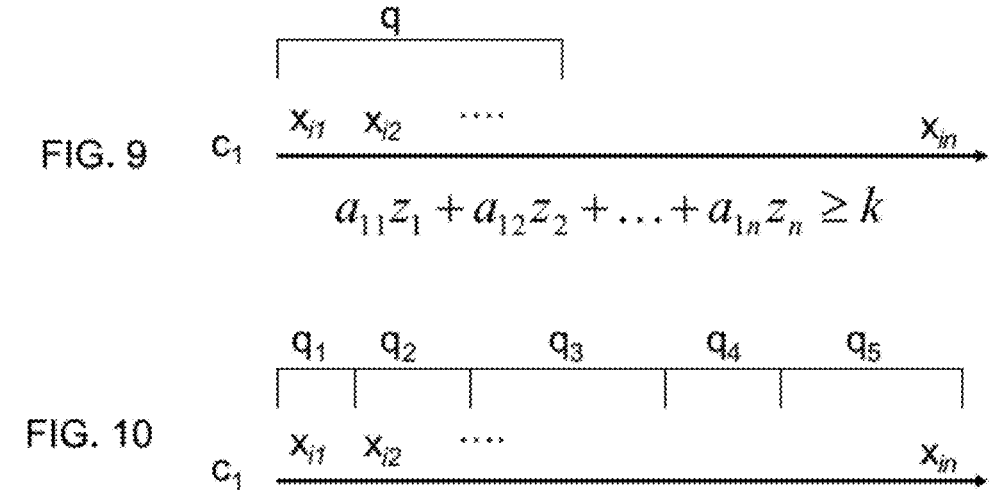
$$a_{11}^1 z_1 + a_{12}^1 z_2 + \ldots + a_{1n}^1 z_n \geq k_1$$
$$a_{11}^2 z_1 + a_{12}^2 z_2 + \ldots + a_{1n}^2 z_n \geq k_2$$
$$a_{11}^3 z_1 + a_{12}^3 z_2 + \ldots + a_{1n}^3 z_n \geq k_3$$
$$a_{11}^4 z_1 + a_{12}^4 z_2 + \ldots + a_{1n}^4 z_n \geq k_4$$
$$a_{11}^5 z_1 + a_{12}^5 z_2 + \ldots + a_{1n}^5 z_n \geq k_5$$

SYSTEM FOR TRAINING CLASSIFIERS IN MULTIPLE CATEGORIES THROUGH ACTIVE LEARNING

BACKGROUND

1. Technical Field

The disclosed embodiments relate to a system and methods for active learning to train classifiers in multiple categories, and more particularly, to efficiently train classifiers in multiple categories by requiring far fewer editorially-labeled examples from large datasets, and to test the trained classifiers on unlabeled data sets with the same methods.

2. Related Art

The rapid growth and ever-changing nature of web content demands automated methods of managing it. One such methodology is categorization in which document (and other types of) content is automatically placed into nodes of a human-induced taxonomy. Taxonomy is a hierarchy of categories; taxonomies defined for the web are typically large, often involving thousands of categories. Maintaining the relevance of the classifiers trained on such taxonomies over time, and the placement of new types of content such as ads, videos, forum-posts, products, feeds and the other data "examples" into a pre-defined taxonomy require the availability of a large amount of labeled data. The content of the web is ever-growing, so classifiers must be continually updated with newly-labeled examples.

Labeling data is an expensive task, especially when the categorization problem is multiclass in nature and the available editorial resources have to be used efficiently. Editorial resources refer to human editors who manually review an example to label it. Active learning is a well-studied methodology that attempts to maximize the efficiency of the labeling process in such scenarios. Active learning typically proceeds by first training an initial model on a small labeled dataset. Provided that there are a large number of unlabeled examples, it then selects an unlabeled example that it believes is "informative" and will improve the classification performance the most if its label is revealed. The example is then labeled by human editors and added to the initial training set. This procedure is repeated iteratively until convergence of the performance, or in a more realistic restriction, while labeling resources are available. In a more realistic setting, to limit the turnaround cycle, active learning selects not just one but a batch of informative examples to be labeled during each active learning iteration.

Existing active learning approaches differ in the technique used to define the informativeness of a data point or example. While some solutions focus exclusively on binary categorization problems, some are restricted to specific types of classifiers, and some others require a number of extra classifiers to be trained for each classification task. These approaches become infeasible, however, when dealing with a large, multiclass categorization problem such as the ones that abound in real-world web content.

One straight-forward multiclass, active-learning strategy is to apply binary active learning techniques on decomposed, binary subproblems and select the topmost-informative examples independently for each binary classifier. These are examples of local active learning methods, which have been criticized for their lack of ability to scale to real-world problems. For instance, if a taxonomy contains a thousand nodes, choosing a single most-informative example per binary subproblem would account for a thousand examples to be labeled during each iteration of the multiclass problem. Performing just twenty iterations—as performed in the experiments disclosed herein—would require editorial resources for labeling twenty thousand examples, which would be infeasible in most real-world applications.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the present disclosure. In the drawings, like referenced numerals designate corresponding parts throughout the different views.

FIG. 7 is an exemplary graph showing a hypothetical ordering of examples ($x_i$) in an active pool U according to their informativeness with respect to two of the one-versus-rest classifiers ($c_1$ and $c_2$).

FIG. 9 is an exemplary diagram of a dataset showing one constraint per category in multiple-class active learning, where $a_{1j}=1$ when $x_j$ is among the top q most-informative examples for classifier $c_1$.

FIG. 10 is an exemplary diagram showing one constraint per score bucket ($q_t$) from which to sample in a multiple-class test set sampling.

DETAILED DESCRIPTION

Figure 1:
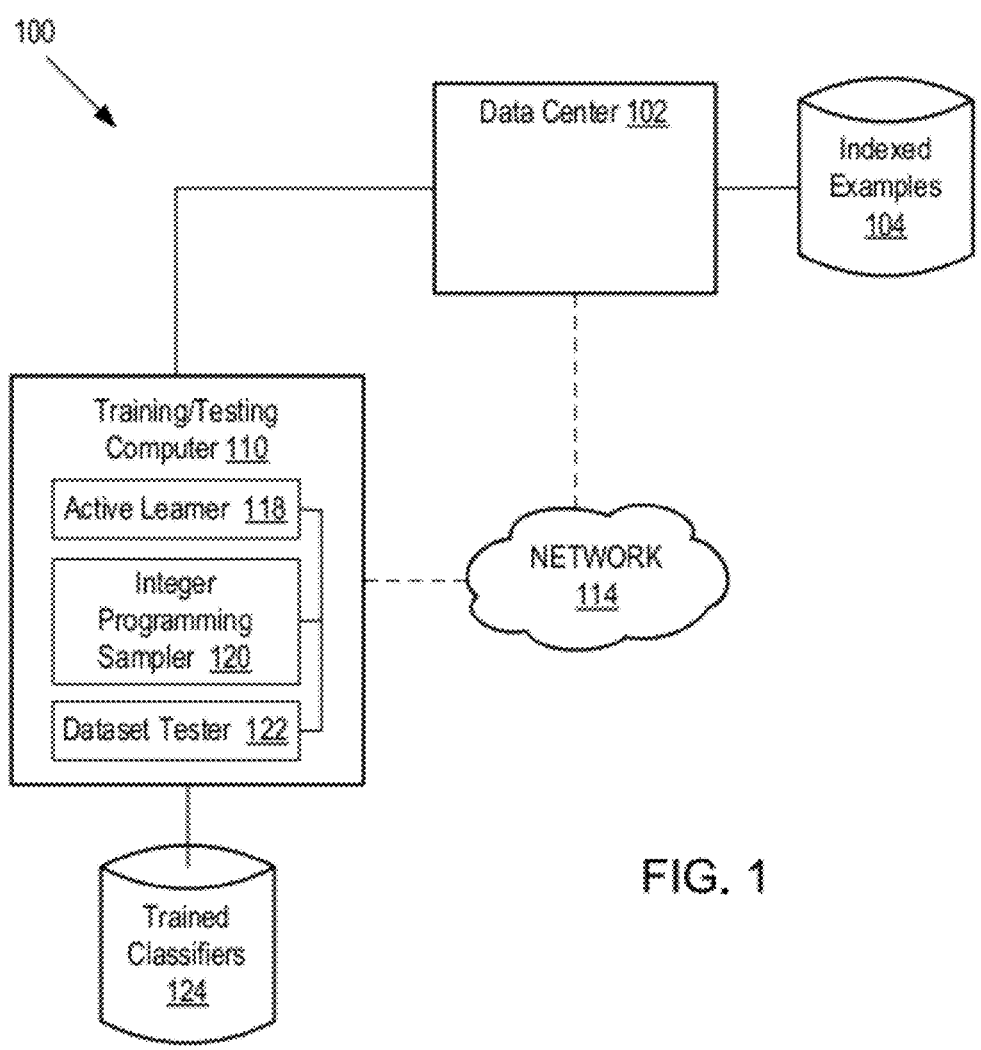
FIG. 1 is a block diagram of an exemplary system for training classifiers in multiple categories through active learning.

By way of introduction, disclosed is a system and methods for training classifiers in multiple categories through active learning. A computer may first train an initial set of m binary one-versus-all classifiers, one for each category in a taxonomy, on a labeled dataset of examples stored in a database.

The computer may then uniformly sample up to a predetermined large number of examples from a second, larger dataset U of unlabeled examples, which may be stored in the database or in a different database in another data center. The computer may order the sampled unlabeled pages in ascending order of informativeness for each classifier. The computer may also determine a minimum subset of the unlabeled examples that are most informative for a maximum number of the classifiers to form an active set for learning. Such determination may be made through use of an integer optimization problem, which may include constraints such as allowing labeling of unlabeled examples in a number fewer than the classifiers needed to be trained for various categories. After human editors label the active set of unlabeled examples, the computer may use the editorially-labeled examples to retrain the classifiers, thereby improving the overall accuracy of the classification system.

Further to that discussed above, active learning is an automatic technique for selecting examples, which if labeled, can most improve the classifiers. This is important in many real-world applications with skewed distributions where naïve (or uniform) sampling usually fails. For example, suppose we try to build a classifier that differentiates all adult pages from the rest of the pages on the web and that we have editorial resources that can label only 100 pages for the machine learning classifier to use as a training set. If we draw 100 pages at random from a search engine index, most likely none of them will be relevant to our problem and we would have wasted editorial time for labeling 100 pages whose labels do not improve our adult classifier at all. In active learning, an initially-trained classifier may be used to guide the selection of examples that should be labeled, e.g., knowing the labels of which examples would be most informative, and would improve the performance of that initial classifier the most.

Applying active learning in the case of multiple classes is challenging. In the above example, 100 suitably-selected pages can result in a relatively accurate adult classifier. In advertising, however, taxonomies are known to include hundreds even thousands of nodes. Behavioral Targeting (BT) may categorize users and content into thousands of categories of interest to the advertisers (and many more custom categories), such as automotive, finance, education, apparel, entertainment, etc. If we apply the above active learning procedure for every one of these categories independently, and assume that 100 pages per category are sufficient (which is rarely the case), we will need editorial resources to label several hundreds of thousands of pages. This is a daunting task, requiring thousands of editorial work hours.

The present disclosure implements an integer programming approach for a multiclass active learning system that reduces the required editorial resources by an order of magnitude, achieving the same classification accuracy as the naïve active learning approach mentioned above.

FIG. 1 is a block diagram of an exemplary system 100 for training classifiers in multiple categories through active learning. The system 100 may include one or more data centers 102 including massive storage of indexed examples, which may be stored in an indexed examples database 104. The system 100 may also include a training and testing computer 110 that may be coupled with or integrated within the data center(s) 102, e.g., the computer 110 may connect to the data center(s) 102 over a network 114. The training/testing computer 110 may include, but not be limited to, an active learner 118, an integer programming-based solver 120, a dataset tester 122, and a trained classifiers database 124.

The training/testing computer 110 may be coupled with or integrated within the data centers 102. Herein, the phrase "coupled with" is defined to mean directly connected to or indirectly connected through one or more intermediate components. For instance, the training/testing computer 110 may be coupled with the data centers 102 through a network 114 including any number of networked switching devices. The active learner 118 may be coupled with the integer programming sampler 120 to solve an integer optimization problem on an unlabeled dataset from which the computer 110 wants to efficiently sample examples for labeling. The computer 110 may also include memory storage in which to store the trained classifiers database 124 in which to keep the trained classifiers updated. The dataset tester 122 may be employed once the classifiers have been trained to test the classifiers on an unlabeled dataset in the indexed examples database 104 or on some other database of unlabeled examples. The computer 110 may include one or more computing devices to provide sufficient processing power to perform the active learning and testing methods as disclosed herein.

With further reference to FIG. 1, search engines such as Yahoo! of Sunnyvale, Calif. maintain large data centers 102 full of indexed data from which to draw to provide as search results to user queries. Additional data centers 102 have been created to index a multitude of other information related to user search behavior, such as queries for instance. Individual elements of the indexed data are referred to as "examples" because the data can range from web pages, documents, news articles, and queries, to audio and video content. To behaviorally target users based on their online search activity, classifiers are trained so that such search activity can be accurately classified and relevant, targeted advertisements ("ads") served to the users. Note that while behavioral targeting is focused on herein, the disclosed training of multiclass classifiers may be applied in a wide variety of contexts, such as, for instance, to train a news classifier for accurately classifying news articles into categories. Such classification may help with both behavioral targeting ads and with returning relevant search results.

Classifier training is performed to accurately label large datasets into a taxonomy, or a hierarchy of categories. Each node in the taxonomy or hierarchy can be assigned multiple examples and each example can possibly be labeled into multiple nodes. Behavioral targeting, for instance, currently categorizes content such as queries and web pages into over 1000 categories of interest and many more custom categories defined as nodes in a proprietary web taxonomy. This helps Yahoo! appropriately target users with ads. For instance, it is helpful to know that a user just visited the "jewelry" page of macys.com or has issued a query asking about a problem related to "parenting and kids." Based on this search activity, it is reasonable to conclude that the user is interested in "jewelry" or in "parenting and children," and therefore should probably be qualified for behavioral targeting within these respective categories.

Taxonomies represent multiclass problems, e.g., there are multiple categories (or classes) into which examples may be classified. This is in contrast to binary classification problems where one deals with two classes, e.g., to detect spam (class-1) versus non-spam (class-2) email. Multiclass problems may be single label or multilabel. In single label problems, an example can belong to only one category. For instance, if one identifies what object is there on an image, one may say that it is either an animal, or a person, or a building, or a tree, etc. Here, animal, person, and building are the categories, i.e. an object cannot simultaneously be a person and an animal. In multilabel problems, an example may have multiple labels, e.g., be assigned to multiple categories simultaneously.

Figure 2:
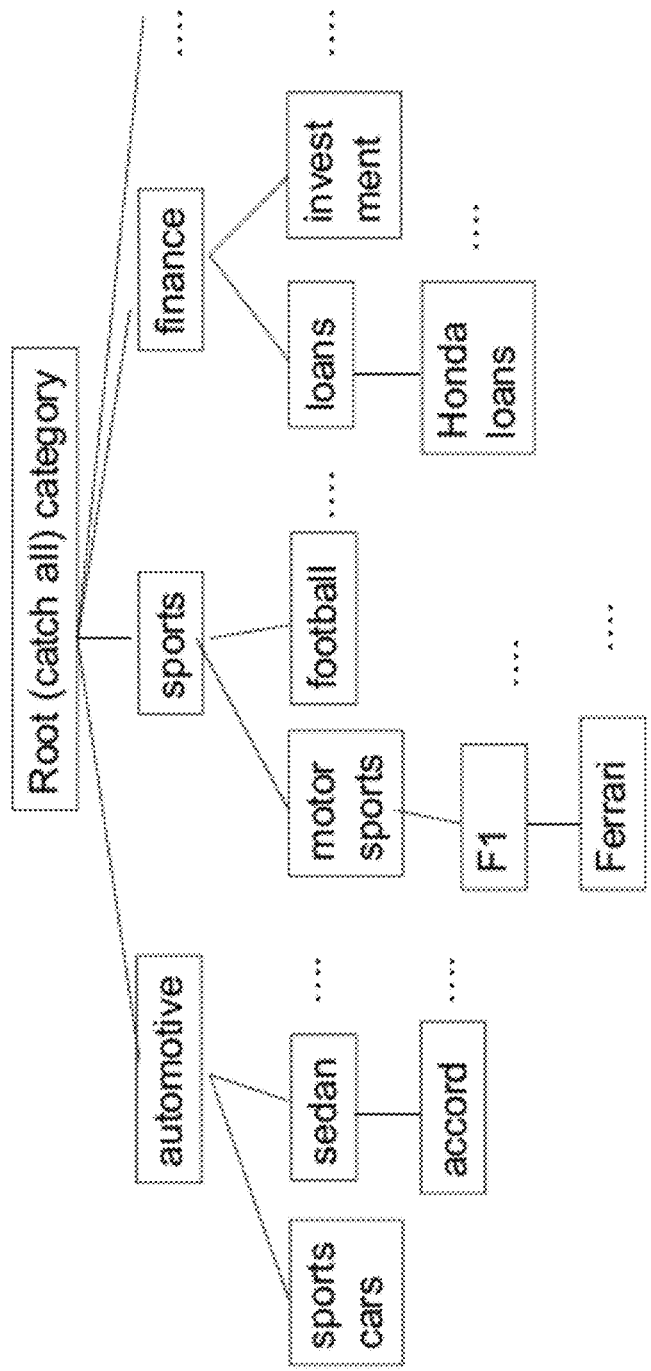
FIG. 2 is an exemplary taxonomy in hierarchical flow chart format depicting a multilabel problem in which examples may be assigned to multiple categories.

FIG. 2 is an exemplary taxonomy in hierarchical flow chart format depicting a multi-label problem in which examples may be assigned to multiple categories. Some examples to be labeled by the taxonomy of FIG. 2 may include, for instance: (1) a webpage about buying Honda Accords which also talks about financing the purchase, so it can belong to both categories automotive/sedan/accord and finance/loans/HondaLoans; and (2) the query "Ferrari cars," which can be related to both automotive/sports_cars and to sports/motorsports/F1/Ferrari. Note that the "/" between subcategories indicates a parent/child relationship in the taxonomy. In example number two above, a user belonging to the former category may be interested in buying a Ferrari, and a user in the latter category may be interested in the F1 race results for Ferrari from last weekend. Accordingly, in advertising, a search engine may deal with multiple categories and that have multiple labels as well. The search engine usually also labels its advertisements, especially those served on behalf of sponsors or affiliates, through human editorial labeling, whether by editors of the search engine or by the sponsors or affiliates. Accordingly, if the search engine can properly label queries, then categorized advertisements served to users will be targeted to their interests or needs.

For most classification problems, editors manually label some examples. For instance, the editors may look at the 100-200 most popular queries every day and label them with the appropriate categories. Similarly, for pages, the editors may assign different articles or stories to different categories in the Yahoo! Directory. This provides the system 100 an initial training set (labeled examples) that can be used to train an initial classifier. The classifiers trained by the system 100 may be one-versus-all multiclass classifiers such that the system 100 trains a classifier to discriminate automotive (one) versus all other categories (the rest), and this is done for all categories in the taxonomy. For a taxonomy of 1000 categories, the system 100 trains 1000 such one-versus-rest classifiers. A classifier is a decision function, examples on one side of it are assumed to be positive (e.g., automotive) and on the other side are assumed to be negative (e.g., nonautomotive). Note that the one-versus-all classifier is an instance of a multiclass classifier that can be used in the system 100. The methods described in this document will also work with other types of multiclass classifier systems.

Figure 3:
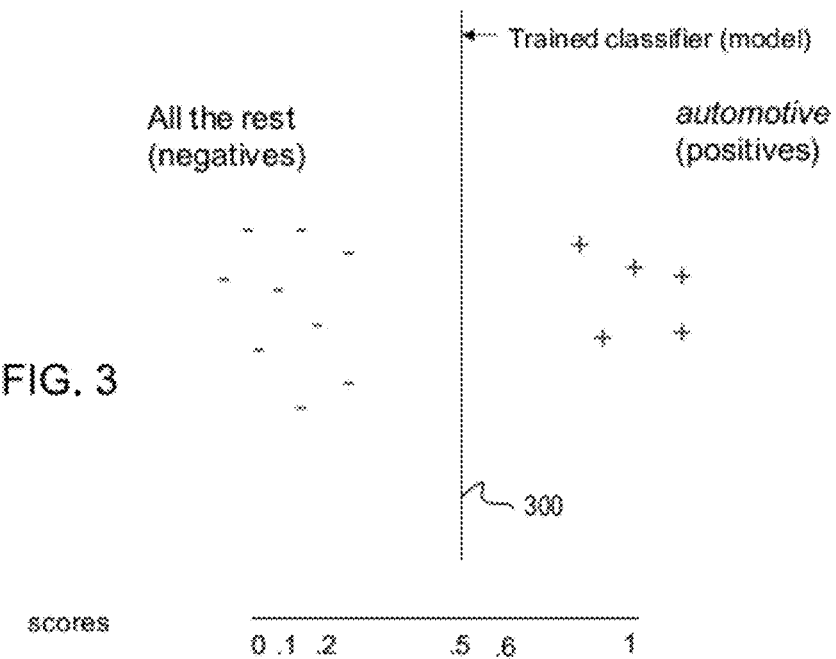
FIG. 3 is an exemplary graph depicting a line representing a trained classifier, and showing scores of labeled examples.

FIG. 3 is an exemplary graph depicting a line 300 representing a trained classifier, which is a function that separates the positive examples, e.g., belonging to the category automotive, from the rest, the negatively-labeled examples, e.g., not belonging to the category automotive. The function or classifier 300 assigns a score to each example. For instance, the scores may be probabilities that indicate how certain the classifier is of accuracy, wherein the farther from the line 300 an example is labeled along a linear scale, the more certain is the classifier. For examples, with scores around 0.5, or 50%, the classifier is less certain and it becomes a coin flip whether or not it may be correct. Examples that are farthest to the left have low scores of being positive 0.1 or 0 (probability 10% or 0%) and examples that are far to the right are most certainly positive which is reflected by their high scores 0.9 or 1 (90% or 100%).

The labeled sets are usually not sufficient to build accurate multiclass classifiers. On one hand, what has been labeled by the editors so far is not a uniform sample of all the population: all pages on the web, all queries that people issue, or all news published in Taiwan, etc. On the other hand, there are new examples that appear every day about which the system 100 did not know at the time of initial training of the classifier: people submit new queries, new stories are being generated, etc. Therefore, the system 100 periodically samples new examples and uses them to improve the multiclass classifiers. Which examples should be sampled and labeled can be determined using active learning (AL).

Figure 4:
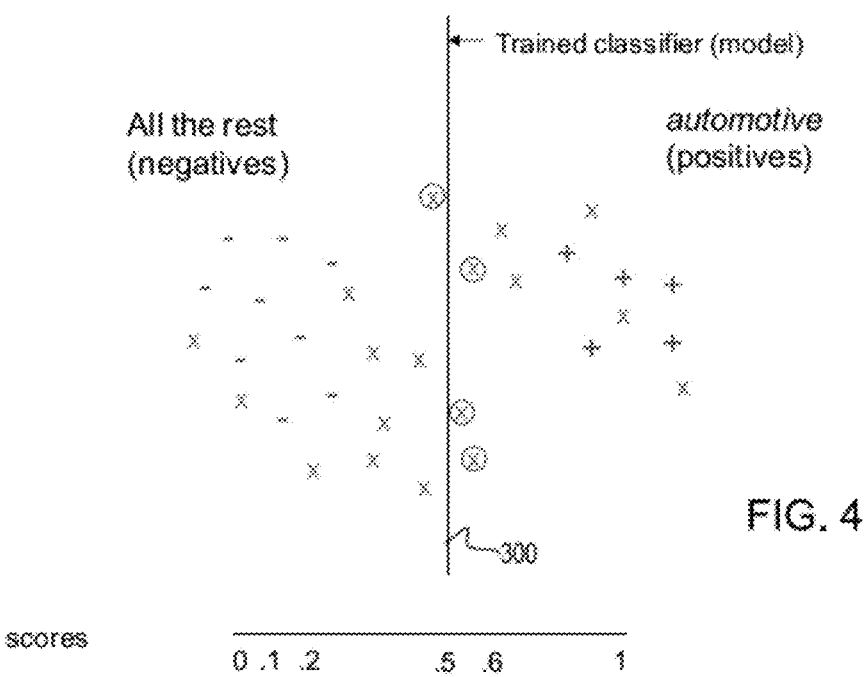
FIG. 4 is the graph of FIG. 3, showing examples as x that are unlabeled and as a circle x that an algorithm determines would be the most informative for the classifier to have labeled.
Figure 5:
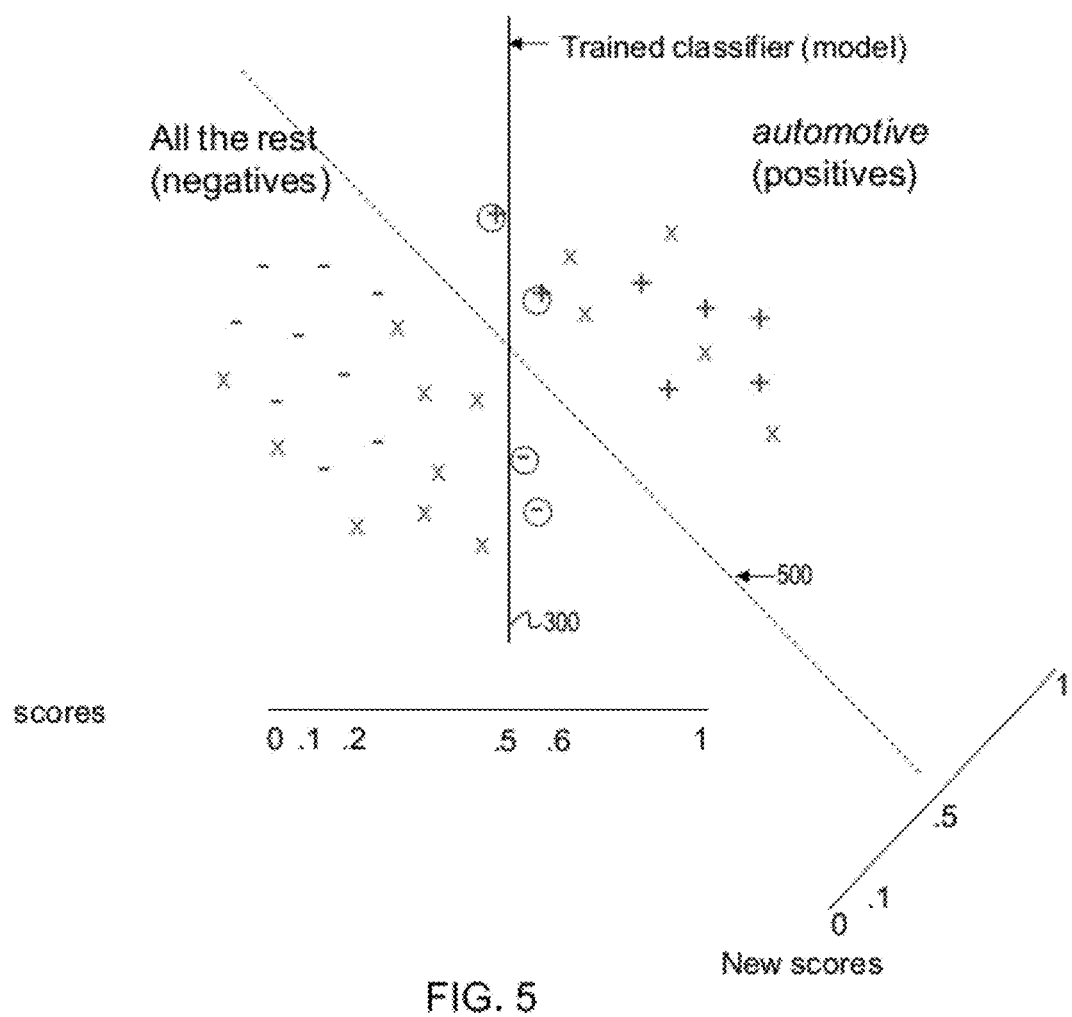
FIG. 5 is the graph of FIG. 4, depicting a line representing a newly-trained classifier after the editors labeled the most-informative examples.

FIG. 4 is the graph of FIG. 3, showing examples as x that are unlabeled and as a circle x that the editors determine would be the most informative for the classifier to have labeled. In FIG. 4, the "x" has been marked to represent other unlabeled examples from the population. Suppose the editors tell the system 100 that they can label 4 examples. Using active learning, the system 100 can determine that the four most-informative examples are the ones circled with black circles. Now suppose that the editors say that the upper two belong to automotive (e.g., they are positive) and the lower two are not automotive (e.g., they are negative) as shown in FIG. 5. This means that the initial classifier does not separate the data well in that it makes errors and using the newly-labeled examples helps train a new, better classifier, which is depicted as the dotted line 500 in FIG. 5.

The new classifier 500 is better as it separates correctly all known points (old labeled plus new labeled). Note, that the classifier 500 assigns different, new scores than the original classifier to the examples. Therefore, the system 100 needs to again score the unlabeled database 104 of documents after each active-learning iteration and run a selection on the newly-scored examples. The manner of deciding which examples to select for labeling will be discussed in more detail below. Note also that the editors may return multiple labels to the selected examples. They may say, for instance, that the top-most circled example in FIG. 5 is automotive, also sports and also entertainment/racing/shows. This means that selecting some examples may be most informative across multiple categories of classifiers, and thus can more efficiently train the classifiers as a group.

To provide clarity to the discussion that follows, the following are typical notations used to describe the active learning process that is followed herein. Let $x_i \in \Re^p$ be a p-dimensional vector that represents one example of input data. Each training point $x_i$ is also associated with an m-dimensional binary vector $y_i = (y_{i1}, y_{i2}, \ldots, y_{im})$, where m is the number of classes in the multiclass categorization problem. Each element $y_{ij} \in \{0,1\}$ is an indicator variable that denotes whether the data point $x_i$ belongs to class j. Note the possibility of a multilabel data set as discussed previously, where multiple $y_{ij}$ in $y_i$ are allowed to have a value of one for each data point $x_i$. The system 100 operates with an initial set of labeled examples L(0) (each $x_i \in L(0)$ has a known $y_i$) and a set of unlabeled data points $U = \{x_1, x_2, \ldots, x_n\}$. The unlabeled set U is usually referred to as an active pool. The active pool should be maintained distinct from the test set for proper evaluation. At each active learning iteration, t, let A(t), also called the "active set," be the set of data points that are selected from U for labeling. Thus, the labeled data available for training at the end of any iteration t is $L(t) = L(t-1) \cup A(t)$. It is a good practice to shrink U, e.g., have $U = U \setminus A(t)$, if one is to avoid the computer drawing again examples that have been already labeled. Let f(t) be the classifier that is trained on the labeled data L(t). It is helpful that editors are asked multilabel questions per example $x_i$. For instance, after labeling, the system 100 determines the full vector $y_i$, which is a more expensive operation than the assignment of binary labels during a binary active learning procedure. That the entire $y_i$ is known allows unambiguous use of $x_i$ in computing f(t+1).

Figure 6:
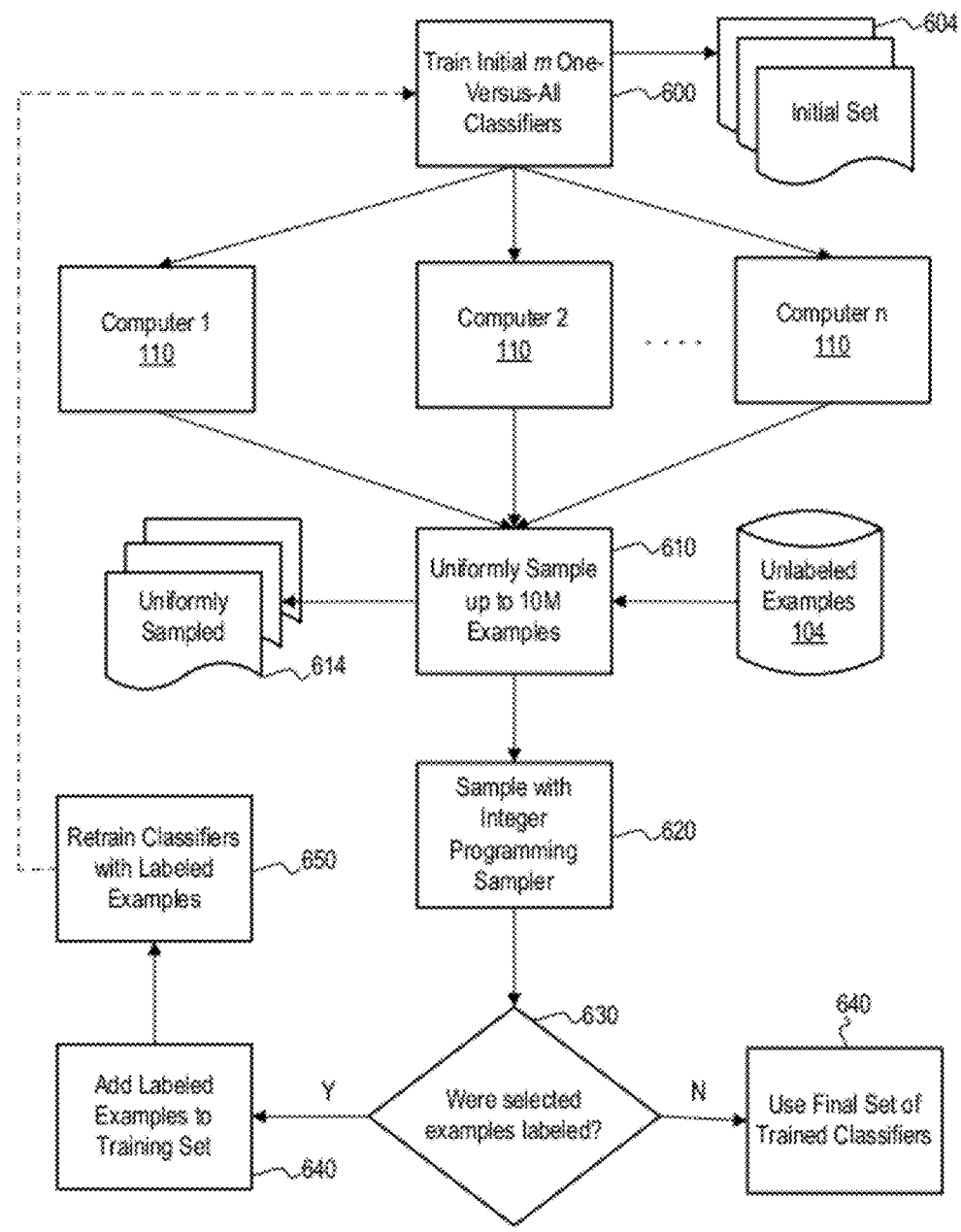
FIG. 6 is an exemplary flow diagram of a method for sampling examples with an integer programming-based solver, to reduce the number of examples that need to be editorially labeled.

FIG. 6 is an exemplary flow diagram of a method for sampling examples with the integer programming-based solver 120, to reduce the number of examples that need to be editorially labeled during active learning. This method will provide the framework for the detailed methods that will be explained later.

At block 600, the method starts by training an initial set of m one-versus-rest classifiers 604, one for each category in the taxonomy. The classifiers can be trained sequentially on one computer 110 or in parallel on multiple computers 110. In one example, the classifiers are trained in parallel using Yahoo!'s Hadoop cluster of computing computers.

At block 610, the computer(s) 110 may uniformly sample a very large number of unlabeled examples creating a uniformly-sampled set 614 of unlabeled examples. This unlabeled set may include, e.g., 10 million pages from Yahoo!'s index 104 containing over three billion pages. Because of the large number in the sampled set of unlabeled examples, even rare categories, such as foreign_cultures/turkish_languages should be represented by at least a few examples, else the category can be ignored as insignificant for purpose of revenue generation.

Because of the large size of the sampled set of unlabeled examples, the editors cannot be asked to label them all. At block 620, therefore, the computer 110 selects the most-informative l examples (say the most-informative l=1000 examples) to be labeled at each iteration using an improved algorithm that selects the most-informative examples for the classifiers in the taxonomy as a whole.

The system 100 first orders the examples according to their informativeness for the individual classifiers. In one example, the system 100 uses the least confident strategy, e.g., choosing to label those examples as most informative with a score close to a 50% confidence level. FIG. 7 is an exemplary graph showing a hypothetical ordering of examples $(x_i)$ in an active pool U according to their informativeness with respect to two of the one-versus-rest classifiers ($c_1$ and $c_2$). Data point $x_2$ is not the most informative, but is informative for both $c_1$ and $c_2$ and is, therefore, preferred by the proposed algorithm. Note that k is the size of a pool of most-informative data points, and q is the size of a relaxed pool of most-informative data points.

At block 620, the system 100 runs the integer programming based solver 120 on the uniformly-sampled examples, which will be discussed in more detail later, to select the l examples that are informative across a maximum number of classifiers, such as is $x_2$ for $c_1$ and $c_2$ in FIG. 7, for instance. At block 630, the system 100 determines if the selected examples l were labeled by editors. If the answer is yes, then the system 100 adds the labeled examples to the training set, at block 640, and retrains the classifiers with the labeled examples, at block 650. If additional editorially resources are available, the method may proceed back to block 600 to begin another training iteration. If, at block 630, no examples were labeled, then the system 100 may use the final set of trained classifiers, at block 640, as labeled examples cease to come back from the editors. The classifiers are thus ready to be used on an unlabeled dataset for testing or to perform automated labeling for any number of applications, as discussed previously, depending on the types of classifiers that were trained.

Multiclass Active Learning

As mentioned, most popular approaches to active learning are not scalable for the task of large-scale multiclass active learning. On the other hand, methods that are specifically designed for such problems follow a greedy approach in which the active learning method attempts to improve the worst-performing binary classification task first. Such an approach might be unsuitable because some binary categorization tasks may be consistently and inherently harder to learn than others. For example, if a taxonomy contains the nodes News and Sports Cars, learning a classifier for the concept-rich node News, an obviously harder task, will require a lot more data than the node Sports Cars. It might be expected that such harder classification tasks will consistently perform slightly worse than the rest, and as a result, during every active learning iteration, the global ordering may suggest that the most-informative examples are those that will improve the News classifier the most. This might lead to almost no improvement in the rest of the binary classifiers.

In contrast, proposed herein is an integer programming based approach that finds active learning sets, A(t), containing examples that are informative across the maximum number of classifiers as opposed to just one. Apart from providing scalability for large multiclass problems, the method—as will be presented shortly—has a number of advantages, including but not limited to the following. First, the proposed solution is agnostic to the underlying binary classifiers that are used. Second, the methodology builds upon the active sets chosen by the underlying active learning strategy for each binary classification problem and is thus independent of the specific active learning method employed. Third, the proposed integer programming approach easily scales to classification problems with thousands of classes and active pool sizes in the order of millions. Fourth, there is a straight-forward interpretation as to why a particular active set of examples is chosen during an iteration, namely, that the selected examples are the ones that are informative for the maximum number of classes. Fifth, the method allows flexibility in setting class-specific weighting of the data-points, if needed. For example, there might be a stringent business requirement for the accuracy of a particular category, say Finance, to be the best possible or one might know a priori that certain categories, say Baby Apparel, are poorly represented in the initial set of labeled data points. Below is demonstrated that the present method allows such requirements to be incorporated intuitively into the active learning process, thereby ensuring the improvement of the associated classifiers.

Integer Programming Formulation

For brevity, the proposed Integer Programming approach for Multiclass Active Learning may be referred to herein as IPMCAL. After decomposing the problem into binary subproblems, for each subproblem, an active set selection mechanism infers an ordering of the data points in the active pool U according to their informativeness. For instance, in the case of large margin classifiers, such an ordering can be provided by the distance of each data point to the separation plane for the subproblem. Similarly, for generative models, the ordering may be provided by the uncertainty sampling method. An optimization problem, presented below, is then applied to select an active set A(t) using the inferred orderings for all binary classification subproblems.

With further reference to FIG. 7, FIG. 7 depicts a hypothetical ordering of the examples in U according to their informativeness with respect to all m binary classifiers $c_j$ into which the multiclass problem has been decomposed. That is, data points $x_1$ and $x_2$ are the two most informative for the binary classifier $c_1$ with $x_1$ being slightly more informative than $x_2$. Similarly, let $x_3$ and $x_2$ be the two most-informative data points for binary classifier $c_2$. If there is the labeling capacity for k=1 data point per active learning iteration and one chooses to label $x_1$, one may ensure most improvement along classifier $c_1$ but almost no improvement for classifier $c_2$. Data point $x_2$ is not the most informative one for classifier $c_1$ so if we label it, we will have potentially less improvement along $c_1$ than if we had added $x_1$ to the active set. This data point, $x_2$, however, is also informative for $c_2$ and therefore might improve more the overall performance of the multiclass model. Thus, within the IPMCAL framework, at each iteration, the system 100 tries to identify data points like $x_2$ that contribute to the improvement of a maximum number of binary classifiers.

To generalize the above intuition, suppose we have labeling resources that at each active learning iteration, t, allows choice of an active set of size k for each of the m one-versus-rest binary classifiers, e.g., at each iteration we can label l=km distinct data points from the active pool. These class-specific active sets may be denoted as $A_i(t)$ where i=1 ... m. Then the overall active set A(t) for the entire multiclass problem is $A(t)=U_{i=1}^{m} A_i(t)$ with |A(t)|=km. Instead of selecting the top k most-informative examples per class, the system 100 uses a relaxed pool (q) of potentially informative examples with size q>k. The system 100 still chooses k data points per class but we can now optimally select them to make sure that as many of them as possible appear in multiple active sets $A_i(t)$. Obviously, larger values of q will allow more data points to be shared across the individual active sets, as in the case of data point $x_2$ in FIG. 7. However, there is an apparent trade-off. The larger the q, the higher the number of data points that appear across different active sets $A_i(t)$, but the average informativeness of each individual active set also decreases. In the description that follows, we are going to revisit this question and provide guidelines for choosing the right size q of each $A_i(t)$.

For every example $x_j$ in the active pool U, we now introduce a selector variable $z_j$, where:

$$z_j = \begin{cases} 1 & \text{if } x_j \text{ selected for labeling} \\ 0 & \text{otherwise} \end{cases}$$

Since the system 100 selects at most l examples per iteration, we have $$\sum_{j=1}^{n} z_j \leq l.$$

We further introduce the binary indicator constants $a_{ij}$, where:

$$a_{ij} = \begin{cases} 1 & \text{if } x_j \text{ is in the relaxed pool } q \text{ for class } c_i \\ 0 & \text{otherwise} \end{cases}$$

Note that $a_{ij}$ are known since the relaxed pool set has already been selected according to some informativeness criterion. The following inequality now represents the fact that the system 100 obtains the labels of at least k informative data points for each $A_i(t)$:

$$a_{i1}z_1 + a_{i2}z_2 + \ldots + a_{in}z_n \geq k \quad (1)$$

The number of classes for which $x_j$ is informative can be expressed through the sum:

$$\hat{A}_j = \sum_{i=1}^{m} a_{ij}.$$

Since the goal is to find those examples that are informative across a maximal number of classes, the optimization criterion is to maximize the sum $$\sum_{j=1}^{n} \hat{A}_j z_j.$$

Combining this objective function with the inequality (1), we obtain the following integer optimization problem for an active learning iteration:

$$\max_z \sum_{j=1}^{n} \hat{A}_j z_j \quad (2)$$

$$\text{s.t. } a_{11}z_1 + a_{12}z_2 + \ldots + a_{1n}z_n \geq k$$
$$a_{21}z_1 + a_{22}z_2 + \ldots + a_{2n}z_n \geq k$$
$$\ldots$$
$$a_{m1}z_1 + a_{m2}z_2 + \ldots + a_{mn}z_n \geq k$$
$$\sum_{j=1}^{n} z_j \leq l$$

where we have indicated with z the vector of all selector variables $z_j$. As mentioned earlier, business directions or rules sometime make it necessary to weight some classes higher or one might want to focus on a particular class because of its poor performance. Such class-specific weighting can be achieved by spreading the data points l across the m classes. That is, instead of a single k, we may have multiple constraint constants $k_i$ in problem (2), where $$l = \sum_{i=1}^{m} k_i.$$

Note also that the above optimization problem (2) represents a single active learning iteration, and we can also adjust $k_i$ from one iteration to the next according to a current belief in the performance of the underlying binary classifiers. The constraint vector may be recast as $k=(k_1, k_2, \ldots, k_m)'$. For the rest of the present disclosure, we will use the following shorter representation of problem (2):

$$\max_z \hat{A} z \quad (3)$$

$$\text{s.t. } Az \geq \bar{k}$$
$$\sum_{j=1}^{n} z_j \leq l$$

where we have set $\hat{A}$ to be the transposed vector of all $\hat{A}_j$, and A is the matrix of all indicator variables $a_{ij}$.

Though an exact solution to the integer optimization problem of problem (3) is NP-hard to resolve, there are different approximation techniques that can solve it both effectively and efficiently. The feasibility pump by Fischett, Glover, and Lodi is one such approximation that is readily available in most commercial or freeware linear programming solvers. The method iteratively finds a relaxed real value solution, for problem (3) and then rounds it to the closest binary solution. This is repeated until convergence. The evaluation presented in the experimental evaluation discussed below uses the freeware lpsolve for binary optimization as it can solve sparse problems with thousands of constraints and a few hundreds of thousands of examples. This is sufficient to address many real-world problems over taxonomies containing thousands of classes. To see this, consider the fact that the number of constraints in the present formulation is equal to m+1. Note that every class constraint in problem (3) has exactly q nonzero $a_{ij}$ indicator constants, e.g., one for each variable that enters the relaxed informative pool from which we are to select $A_i(t)$. This means that we have at most qm variables. If the computer 100 considers m~1000 and q~100, the method results with at most a hundred thousand variables even for very large multiclass problems. In reality, because many of the variables appear in multiple constraints, which is the very property the proposed algorithm exploits, the actual number of variables is far less than qm.

Practical Considerations for IPMCAL

Formulation (3) assumes that there are labeling resources that allow us to draw an active set A(t) that contains at least one informative example (e.g., $k \geq 1$) per classifier. Here, we consider the case in which the number of classes is larger than the number of total examples allowed for labeling per iteration. Such cases are not uncommon for real-world problems with excessively large taxonomies, and provide precisely the setting where the direct application of local techniques, which select informative examples from the binary subproblems independently, fail to identify the best active set with respect to the overall multiclass problem. We now show that a simple modification of problem (3) can cope with the insufficient labeling resources problem.

We first substitute the vector with informative pool sizes k in problem (3) with the vector of ones $\overline{1}=(1,1,\ldots,1)'$, thereby guaranteeing that we draw for labeling at least one informative data point per class/category. As we do not have sufficient resources to label m data points, we relax some of the constraints by introducing m new binary slack variables $\xi_i$ (i=1 ... m) and subtracting them from each of the first m constraints. Using the vector form $\xi=(\xi_1, \xi_2, \ldots, \xi_m)'$, we rewrite problem (3) as:

$$\max_{z, \xi} \hat{A}z - C\xi \quad (4)$$

$$\text{s.t.} \quad Az \geq \overline{1} - \xi$$

$$\sum_{j=1}^{n} z_j \leq l$$

All variables $x_i$ and $\xi_i$ are binary and problem (4) remains a standard binary optimization problem. In the above formulation, we also introduced a penalty vector $C=(c^1, c^2, \ldots, c^m)$. The intuition behind this is that if we cannot satisfy the constraint for binary problem i, e.g., $\xi_i=1$, then the objective function should pay a penalty proportional to some constant $c^i$. In our evaluation, we treat all classes equally and set all $c^i$ equal to one million. In this form, the interpretation behind problem (4) is as follows. We try to satisfy as many constraints as possible, and from all solutions that satisfy the maximum number of constraints, we pick the one that has most shared variables across the satisfied constraints. On the other extreme is the case were all $c_i=0$ negating the constraints for all classes. The interpretation now is as follows. We choose the solution that has/distinct examples which occur in the maximum number of $A_i(t)$. This is a somewhat greedy setting which may end up selecting data points that are informative only for a subset of classes. In between these two extremes, for an active learning iteration, t, we can set some $c_i=0$ and others not when we want to focus on improving the performance of a subset of classes. Finally, note that formulation (4) can also be used for solving the case when we also have sufficient resources to label $k \geq 1$ examples per class. In this case, if we set $c^i$ to a large constant, both formulations (3) and (4) converge to the same value, but formulation (3) does not use the m additional variables $\xi_m$ and converges slightly faster.

Optimizing Within a Single Constraint

Once we have a solution of problem (3), while it will contain many variables that appear across multiple constraints, it will still have some variables that participate in a single constraint. These are the data points that are most informative for just one of the m binary classifiers on an individual basis. Suppose in the example of FIG. 7 that $x_1$ and $x_i$ are informative only for class $c_1$ and the integer programming solver 120 selects one of them in the final solution. The solution will have the same value for the objective function regardless of which one is included. Yet, in such cases, we would like to choose $x_1$ as it is more informative (appears earlier in the ordering) than $x_i$. The system 100 can force this selection by multiplying every variable in the objective function that appears in a single constraint with a discount factor proportional to its position in the informative ordering. This, however, introduces new parameters and complicates the problem unnecessarily. Instead, the system 100 may be programmed to use the following post-processing step. Once a solution is identified, for the constraint of every class $c_i$, the system 100 identifies those variables in the final solution that appear only in this constraint. Let the number of such variables be s. The system 100 then takes all variables from the $A_i(t)$ for $c_i$ that do not appear in any of the other active sets, while preserving their ordering in $A_i(t)$. In the final solution, the system 100 substitutes the s original single constraint variables with the topmost-informative s single-constraint variables from the relaxed pool q for classifier $c_i$. Because the system is substituting s variables that only appear in the pool for $c_i$ with other s variables that appear only in the same pool, the objective function preserves its value and none of the constraints are violated.

Finding the Size of the Relaxed Pool

An important question that still remains to be discussed is how to select q, the size of the relaxed informative pool. Given a validation set, one can use it to determine the appropriate value of q. Validation sets, though, are not always readily available and may require additional labeling resources. More importantly, practitioners often resort to active learning when they believe that the performance of their initial classification system has declined over time, due to gradual shift in the test distribution from the training one. In these cases, it is inadequate to estimate a parameter for an evolving test distribution with a validation set. We, therefore, devised an unsupervised procedure for determining the value of q. Note again the unlabeled active pool U can be "refreshed" with newer examples from a distribution similar to that of the test environment. For instance, if a search company wants to categorize queries, it can always sample from the query traffic to its search engine a couple of weeks before deployment and use this sample as the active pool U. This makes U suitable to draw conclusions for the value of q.

Now suppose that we are allowed to draw and label the top k most-informative data points for each class independently and combine the data points from all classes to obtain the active set, A(t), for iteration t. This is a local minimum confidence (LocalMinConf) active learning strategy. Later on, we show that this simple, off-the-shelf strategy—ignored lightly as inefficient—is in fact quite competitive and hard to improve upon. If we set q=k, the IPMCAL method converts into a LocalMinConf active learning strategy, that is, we choose the k most-informative examples within a relaxed pool of size q=k. On the other extreme, we can set the relaxed pool size q for each class to n, the number of examples in the active pool U. In this case, all examples are assumed to be informative for each of the classes. Naturally, all solutions of problem (3) will lead to the same objective value and the system 100 will pick data points at random. When q=n, therefore, IPMCAL converges to the random strategy.

Apparently, the possible values for q lie in the interval $k \leq q \leq n$. In this setting, IPMCAL is a slight relaxation of a LocalMinConf active learning strategy that can achieve similar performance at potentially lower cost by exploring data points that are informative across multiple classes. The system 100, therefore, chooses values for q that are at most an order of magnitude or two larger than k. In particular, the system first solves problem (3) for q=k. If the value of the objective function is v, the system starts relaxing q (e.g., choosing q=5 k, q=10 k or q=100 k) until the system obtains a new value $v_{new}$ for the objective function that is in the range $1.5v \leq v_{new} \leq 10v$, for instance. This strategy ensures that the system does not relax the pool size too much, so the data points in the pool are still relatively informative and at the same time also appear in the relaxed pools for multiple classes.

Note that the size of U may also impact the number of informative examples shared across the relaxed pool of different classes. With a very large active pool size, the system 100 needs to ensure that the above procedure does not select q on the order of one thousand or more. This will make problem (3) infeasible even with relaxation techniques for the state-of-the-art integer programming solvers. In our experiments, discussed later, we have used active pools U containing over half a million examples. Even for such active pools, we show that q is not excessively large. This is because the larger a taxonomy is, the more correlation there is likely to be among the categories represented by its nodes. In this case, many examples that are highly informative for one category are likely to be highly informative for similar categories, too. For instance, we have often observed cases where the most-informative examples in a parent category, say automotive, turn out also to be the mostinformative examples for its child categories as well, say automotive/sedan. This is quite natural because it is harder to differentiate a parent node from its child nodes than from all other nodes and vice versa. Therefore, examples that help such differentiation are informative both for the parent and for the child nodes. Similar arguments hold for sibling categories or conceptually similar categories.

Experimental Evaluation

Below, we evaluate IPMCAL on several data sets, some of which are of significantly larger size and with significantly more categories than demonstrated by previous works on the topic. The active set selection method is very important for such large problems. To the problem perspective, consider one active learning iteration for the User Queries data set presented below. During each iteration for this data set, the system 100 needs to perform the following steps: train over 900 binary classifiers; score the test and active pool examples with each of them; for each classifier, order the examples in the active pool according to their informativeness; run the active selection procedure, and finally, update the training set. Having a very expensive active set selection method can make this process extremely inefficient. To remedy the efficiency problem, many active set selection methods consider active pool sets of unreasonably small sizes. In reality, however, practitioners are likely to choose examples for labeling from active pools of sizes similar or even larger than the pools of the DMOZ and User Queries data sets described below. In contrast, for small active pool sizes it is not evident whether an active set selection method performs well due to its intrinsic properties or because there is a very limited set of options to choose from and it happened to choose the right subset.

In all the experiments, we start with a small to medium-size initial training set L(0), a significantly larger active pool U from which we draw the active sets A(t) during each iteration t, and finally, a separate test set T of unlabeled examples which is used for evaluation purposes. Our experiments use the same test set T at each iteration, and a separate pool of unlabeled examples U for active learning. We keep the size l of the active set A(t) fixed across all iterations.

All the data sets were pre-processed to convert the text to lower case and to remove all non alpha-numeric characters. For HTML pages, we ignored HTML tags. While we made use of a stopwords list, we did not use any stemming. Unigram features were then obtained from the processed text and for all data sets, we removed those features that appeared in less than five (5) documents. A bag-of-words representation of the data was obtained which was then converted into a unit vector in the L2-norm space. We cast all our multiclass categorization problems in the one-versus-rest framework. For each binary problem, a Linear Support Vector Machine (SVM) was trained using the LIBLINEAR package with default parameter settings. For one set of experiments, we set the size of the active set A(t) that is l to be equal to the number of classes. However, for multiclass problems with more than 300 classes, this is hardly a realistic setting, so we also experimented with setting l to be a fraction of the number of classes in the data set.

The IPMCAL method was tested against three other active learning strategies as discussed below.

Random selection: This is the baseline approach that any active learning strategy should out-perform. In this method, the active set A(t) for each active learning iteration was selected by sampling l data points from the unlabeled active pool U uniformly at random.

Global Minimum Confidence: This is the winning method expounded by experts referred to as GlobalMinConf. K. Brinker, *On active learning in multi-label classification*, In GfKI, pages 206-213, 2005. A. Esuli and F. Sebastiani, *Active learning strategies for multi-label text classification*, In ECIR '09: Proceedings of the 31th European Conference on IR Research on Advances in Information Retrieval, pages 102-113, 2009. In this approach, for each active learning iteration t, the active pool U was scored by each of the m SVM classifiers. For each data point $x_j$ in U, a vector $s_j \in \Re^m$ is first computed with each component $s_{ji}$ indicating the functional margin of $x_j$ with the corresponding hyperplane for the $i^{th}$ classification problem. The data point $x_j$ is then associated with the global minimum confidence score in $s_j$, that is we get $(x_j, (\min_i(s_{ji}))$ pairs. All the data points in U are then sorted by the global minimum confidence score and the l data points in U with the lowest score are added to the active set A(t).

Local Minimum Confidence: This is our adaptation of the local methods. As with the GlobalMinConf method, however, we first obtain the vector $s_j$ of confidence scores for each $x_j$ in U. Unlike the global strategy, each set of scores for the $i^{th}$ classification problem is treated independently. Thus, we have m sets of scores, say $L_i=\{s_{ji}\}_{j=1}^{|U|}$, i=1 ... m. Each $L_i$ is sorted in increasing order of the confidence scores and the system 100 picks the first k=⌈l/m⌉ data points from it, where l is the size of the active set A(t). If some of the top k examples repeat across multiple $L_i$ sets, then the system randomly selects a subset from the $(k+1)^{st}$ least-confident examples for each classification problem until the system guarantees that l distinct examples for labeling in A(t). Note, that some experts provide guarantees for the optimality of this method of active set selection in the case of binary classification, which makes combining the selected examples from each binary classifier theoretically justifiable. Regardless of the theoretical guarantees and the simplicity of the method, however, it is usually ignored as a comparative baseline in multiclass active learning. While editorial restrictions typically allow fewer data points in an active set than there are classes in the data, e.g., l<<m, the exact setting we are addressing in this paper, one can still draw the topmost-informative example for each binary classifier, and then choose a random subset of size l from these examples. Our experiments show that this approach often outperforms the GlobalMinConf method. We henceforth refer to this strategy of active set selection as LocalMinConf. The IPMCAL method proposed here may be viewed as an extension of LocalMinConf that is also capable of exploring existing correlations between the classes, rather than treating them independently.

We evaluated IPMCAL and the competing approaches on four data sets with diverse number of categories and with variable training and active pool sizes. We now provide some details about each of these data sets.

Reuters 21578: This is a publicly-available data set consisting of 12,902 articles in 118 classes. We partitioned the data using the ModApte split to obtain a test set of 3299 documents. The remaining documents were split at 30%-70% to obtain the initial labeled set L(0) and the active pool U, respectively.

Reuters RCV1-V2: This is another publicly-available data set consisting of 804,414 news articles from the Reuters news agency classified into 103 categories. We made use of the chronological LYRL2004 split to obtain a test set T of size 781,265 and for the remaining data points we used a 30%-70% random split to generate the sets L(0) and U, respectively.

DMOZ: The DMOZ data comes from the Open Directory Project (dmoz.org) in which human editors maintain a taxonomy for web pages. The data set consists of URLs annotated with short, human-written snippets describing their content and placed in one of 367 categories. For our experiments, we ignored the URLs and obtained 1,690,214 text snippets in the 367 categories. We used a random 10%-40%-50% split of this data to obtain the initial labeled set L(0), the active pool U, and the test set T, respectively.

User Queries: This data set consists of 1.2 million queries placed by human editors into 1019 categories. We fed each query into the Yahoo! search engine and used the abstract of the first search result to obtain more context for the queries. We used the 10%-40%-50% random partitioning of this data as well to obtain the initial labeled set L(0), the active pool U, and the test set T, respectively.

Note that for all data sets, only those classes that have at least five (5) data points in all three sets (L(0), U, and T) are retained. The data was pre-processed as described earlier and only those data points that have at least five features are retained. Such cleaning reduced the number of classes and the number of data points in each set. Table 1 shows the final numbers.

TABLE 1

Data sets used in the evaluation.

| Dataset | Train set | Active Pool | Test set | Classes |
|---|---|---|---|---|
| Reuters 21578 | 2282 | 5385 | 2973 | 55 |
| Reuters RCV1-V2 | 7070 | 16079 | 781265 | 92 |
| DMOZ | 168812 | 675975 | 844971 | 367 |
| User Queries | 188655 | 437188 | 625101 | 917 |

Evaluation Metrics

We used two evaluation metrics that capture the improvement of the overall multi-class problem, as follows.

Average Area Under the Precision Recall Curve: Using the standard definitions of precision and recall for each binary categorization problem, we obtain the corresponding precision-versus-recall curve. The data sets that are being evaluated in this paper are highly imbalanced; precision-recall curves are better suited for estimating the performance of classifiers on such data sets than ROC curves. The area under the precision-recall curve (APRC) is then measured to estimate the performance of the binary classifier. We then average the APRC from all the binary categorization problems to obtain a single measure for the performance of the multiclass categorization task.

Macro-F1: For each binary categorization problem, we obtain the F1-measure (harmonic mean) of each precision-recall pair. The maximum such F1 value is then used to characterize the performance of the binary classifier in question. To obtain a single measure that characterizes the performance of the multi-class categorizer, we take the arithmetic average of the maximum F1-values that are obtained for the underlying binary problems to obtain the Macro-F1 score.

Thus, for each active learning iteration t, for each methodology (Random, GlobalMinConf, LocalMinConf, and IPMCAL), we obtain the APRC and Macro-F1 score metrics by applying the corresponding one-versus-rest multiclass classifier on the test set T. The APRC curves and the maximum F1 value are first obtained individually for each binary classifier and then we compute the average APRC and the Macro-F1 score to obtain a single number indicating the performance of the active learned multi-class classifier.

Table 2, below, summarizes the results of two sets of experiments performed for each data set, where the bold text indicates the winner, or the top two winners if they are not significantly different. For each method, Table 2 shows the average area under the precision recall curve (APRC) and the Macro-F1, after performing 20 active learning iterations. For the first set of experiments, we draw l=m examples for labeling during each iteration. For the second set of experiments, for Reuters and RCV1, we assume that we can label approximately half as many examples (e.g., 20 and 50 respectively), while for the larger data sets DMOZ and User Queries, we assume we are allowed to label 200 examples per iteration. Note that for the presented settings, LocalMinConf and IPMCAL outperform GlobalMinConf consistently.

TABLE 2

Performance across different datasets.

| Dataset | Ex. Per Iteration | APRC | | | | Macro-F1 | | | |
| --- | --- | --- | --- | --- | --- | --- | --- | --- | --- |
| | | Random | Global MinConf | Local MinConf | IPM CAL | Random | Global MinConf | Local MinConf | IPM CAL |
| Reuters 21578 | 20 | 0.6797 | 0.6896 | 0.7024 | 0.7105 | 0.7534 | 0.7614 | 0.7808 | 0.7875 |
| Reuters 21578 | 55 | 0.6891 | 0.7147 | 0.7269 | 0.7253 | 0.7599 | 0.7849 | 0.7996 | 0.7986 |
| RCV1 | 50 | 0.6520 | 0.6543 | 0.6581 | 0.6616 | 0.6432 | 0.6436 | 0.6456 | 0.6477 |
| RCV1 | 92 | 0.6558 | 0.6623 | 0.6702 | 0.6698 | 0.6445 | 0.6505 | 0.6541 | 0.6548 |
| DMOZ | 200 | 0.4971 | 0.4973 | 0.4988 | 0.4998 | 0.5382 | 0.5384 | 0.5392 | 0.5403 |
| DMOZ | 367 | 0.4989 | 0.4983 | 0.5018 | 0.5026 | 0.5397 | 0.5395 | 0.5416 | 0.5426 |
| User Queries | 200 | 0.4834 | 0.4830 | 0.4860 | 0.4861 | 0.5475 | 0.5473 | 0.5488 | 0.5491 |
| User Queries | 917 | 0.4877 | 0.4881 | 0.4972 | 0.4970 | 0.5507 | 0.5512 | 0.5585 | 0.5587 |

Figure 8:
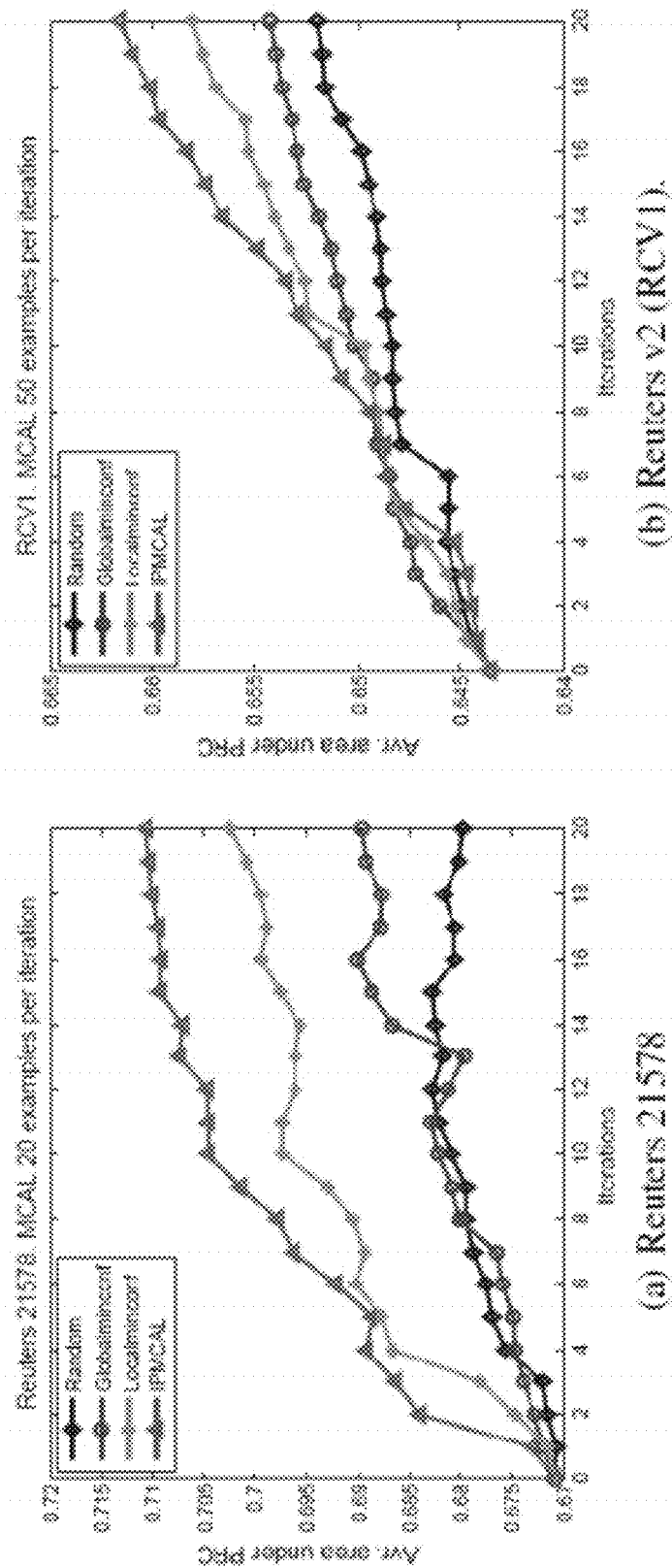
FIGS. 8(a) through 8(d) are graphs showing results of applying the integer programming-based solver to various test sets during 20 active learning iterations for: (a) Reuters 21578 (20 examples per iteration for 55 classes); (b) Reuters v2 (RCV1) (50 examples per iteration for 92 classes); (c) DMOZ (200 examples per iteration for 367 classes); and (d) User Queries (200 examples per iteration for 917 classes).
Figure 8:
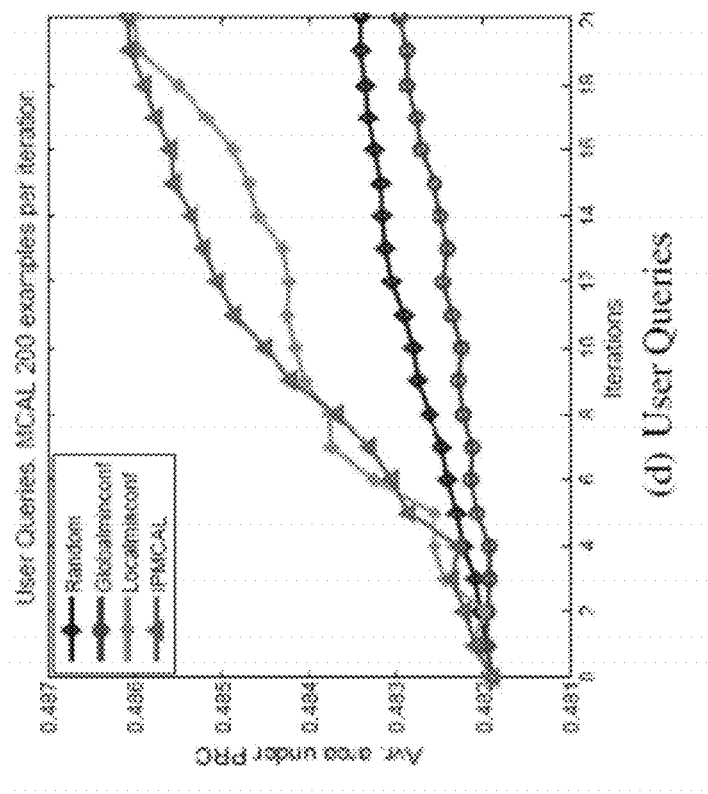
Figure 8:
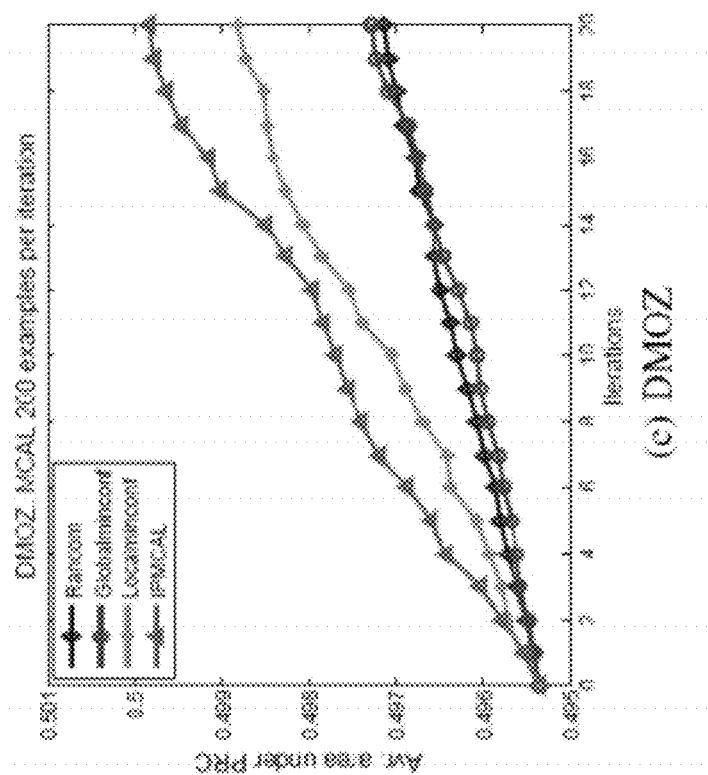

To give a perspective of how the four methodologies behave over time, we also show the APRC during each of the 20 iterations for the second set of experiments in FIGS. 8(*a*) through 8(*d*), for each respective dataset: (a) Reuters 21578; (b) Reuters v2 (RCV1); (c) DMOZ; and (d) User Queries. At each iteration, we are allowed to label fewer examples than the total number of classes. As shown in FIG. 8(*a*), for the Reuters 21578 dataset, 20 examples were labeled per iteration for 55 classes. As shown in FIG. 8(*b*), for the RCV1 dataset, 50 examples were labeled per iteration for 92 classes. As shown in FIG. 8(*c*), for the DMOZ dataset, 200 examples were labeled per iteration for 367 classes. As shown in FIG. 8(*d*), for the User Queries dataset, 200 examples were labeled per iteration for 917 classes.

We decided to see whether this behavior—that LocalMinConf and IPMCAL outperform GlobalMinConf consistently—is preserved if we were to start with a relatively small training set size. For this purpose, we used only 10% of the DMOZ training set (approximately 17,000 examples) making sure that it still contained examples from all 367 categories. In this case, GlobalMinConf did perform comparatively and even slightly better than LocalMinConf and IPMCAL. The performance of all methods, however, was rather poor with all of them having APRC lower than 0.4 compared to 0.5 APRC for the training set size in Table 1.

Using $l=m$ for all four methodologies and across all data sets, we were able to obtain significant improvement in approximately one third to one half of all categories after completing all twenty iterations. The performance of the remaining categories remained unchanged. The reason for that is that many of the categories had very poor initial performance (APRC$\leq$0.2 before the first iteration). Defining robustly "informative" examples for such poor performing models is hard and active set selection methods are likely to introduce little to no improvement.

Given a limited amount of resources (e.g., $l<m$), the IPMCAL method outperformed LocalMinConf on three of the data sets with both methods having similar performance on the User queries data set. As the active pool sizes of Reuters 21578 and RCV1 are relatively small, following the procedure outlined above for both data sets, we chose q=10, which already provides a significant amount of shared informative examples across the classes. For instance, on the RCV1 data set for $l=m=92$ and $q=k=1$, the objective value of problem (3) is 91 (one example is most informative for two of the 92 binary models), while for q=10, the value is 158 (approximately half of the examples now appear as informative for more than one binary model). Similarly, we chose a relaxed pool size for DMOZ and User queries of q=100.

When $l=m$, IPMCAL is slightly outperformed or has similar performance as LocalMinConf on three of the data sets, namely Reuters 21578, RCV1 and User Queries. On the DMOZ data set, though, even for $l=m$, the IPMCAL method outperforms LocalMinConf. This comes to show that for certain problems, even when we are allowed to draw for labeling one or few examples per category during each active learning iteration, we may still be better off if we try to draw examples that are informative across as many categories as possible.

Testing with Behavioral Targeting Categorization

In an additional test, we built initial models for the 195 most-important classifiers in terms of revenue in behavioral targeting categories. To improve the classifiers, we wanted to label 500 new pages per model. Following any of the naïve active learning approaches would have required 97,500 pages to be labeled. To eliminate editorial disagreement, we also wanted to have each page labeled by two editors. This effectively doubles the size of effort required to label the above pages, e.g., we would need about 195,000 labels total. After a small dry-run test, the editors estimated that they would need approximately one minute to label one page, or in other words, approximately 60 pages per hour. Or in total, we would need 3,250 editorial work hours or 406 work days (or about 81 work days) for two editors to obtain two editorial judgments.

Instead, with use of the present system 100 and the IPMCAL method, we managed to achieve the same model accuracy by selecting only 15,000 pages to be labeled. Labeling this set of pages required 250 editorial work hours, or 31 editorial work days for one editorial judgment or approximately 60 days for the two editorial judgments. We used six editors to finish the project within only a couple of weeks.

Testing Existing Multiclass Classifiers

Often to deploy classifiers in production, the system 100 needs to demonstrate that it meets certain performance requirements. Evaluating a classifier to demonstrate its performance requires sampling the unlabeled examples such that diversely-scored examples are present in the sampled set. Then we show the performance of the classifier on the sample. Again, the system 100 may need to sample a few hundred examples per each one-versus-all model, which for 1000 categories, means a few hundred thousand examples to be labeled. This is, once again, an overwhelming task but we can apply the IPMCAL method and reduce this effort.

The difference from the active learning case is that, in the active learning case, there is usually only one constraint, while in testing scenario, there may be multiple constraints per classifier. FIG. 9 is an exemplary diagram of a dataset showing one constraint per category in multiple-class active learning, where $a_{1j}=1$ when $x_j$ is among the top q most-informative examples for classifier $c_1$. So in FIG. 9, there is a single value of q as well as generally one constraint, but the test is performed iteratively to increasingly improve the classifiers over time.

FIG. 10 is an exemplary diagram showing one constraint per score bucket ($q_i$) from which to sample in a multiple-class test set sampling. Here, there are multiple values for $q_i$, in this case, divided into the five (5) buckets covering all of $x_{in}$. Accordingly, in FIG. 10, there will be five (5) constraints as well. As a review, the $a^p{}_{1j}$ variables are indicator constants, which in this case, correspond to a particular bucket, which is known in advance. The $z_n$ are the variables that are learned with solving the problem, and which indicate that a corresponding $x_j$ value is selected to be labeled by an editor. Accordingly, $a^p{}_{1j}=1$ if $x_j$ has a score within bucket $q_p$ for classifier $c_1$.

For example, in testing, we may want to know how well the classifier predicts examples with scores in the range q1=[0, 0.1), in the range q2=[0.1,0.5), in the range q3=[0.5,0.7), in the range q4=[0.7,0.9), and in the range q5=[0.9, 1]. We call each of these ranges, $q_i$, "score buckets." To evaluate the classifier, the system 100 may need to sample say 100 examples from each bucket. We now have not one inequality in the integer formulation for this classifier $c_1$, but five inequalities, one for each bucket. For instance, for 1000 classifiers $c_1$ through $c_{1000}$, we will have 5000 constraints (in the case of MCAL, we have only 1000 constraints—one per classifier). The method for testing the existing multiclass classifiers from here on includes the integer optimization program the same as in the MCAL case, except that it is executed for each $q_i$. Further in contrast with the MCAL case, the test set sampling is usually only performed once (for each bucket) and not iteratively as with the MCAL methods.

Figure 11:
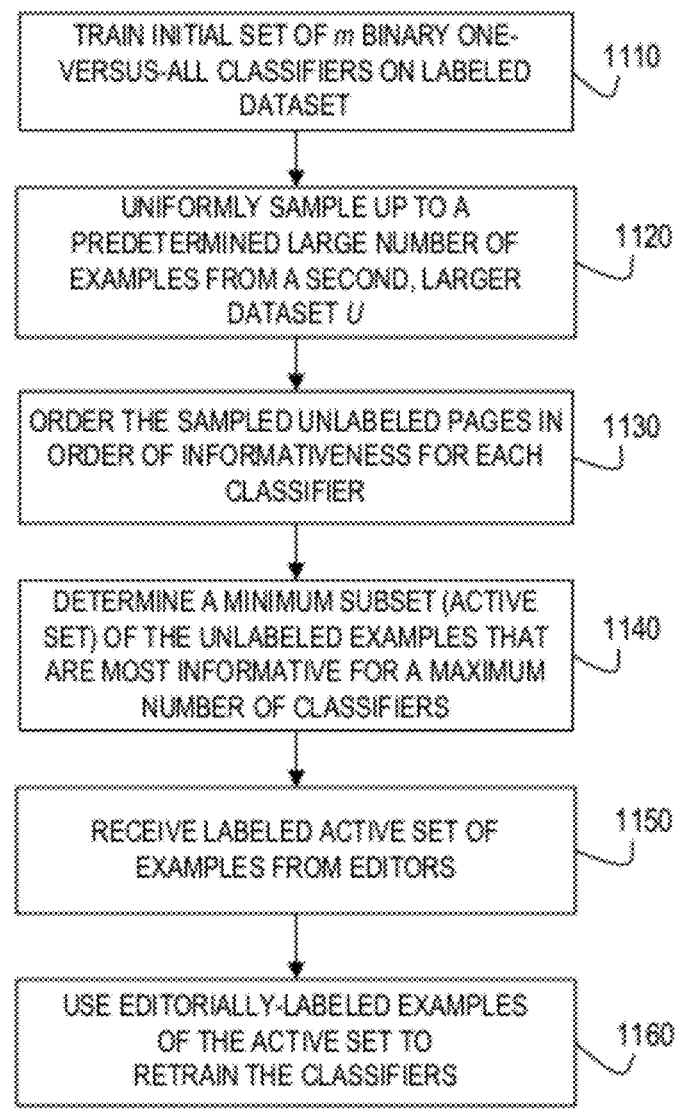
FIG. 11 is a flow chart of an exemplary method for training classifiers in multiple categories through an active learning system.

FIG. 11 is a flow chart of an exemplary method for training classifiers in multiple categories through an active learning system, the method executable by the computer 110 having a processor. To execute the method, the computer 110, at block 1110, trains an initial set of m binary one-versus-all classifiers, one for each category in a taxonomy, on a labeled dataset of examples stored in a database coupled with the computer. At block 1120, the computer uniformly samples up to a pre-determined large number of examples from a second, larger dataset U of unlabeled examples stored in a database coupled with the computer. At block 1130, the computer orders the sampled unlabeled pages in order of informativeness for each classifier. At block 1140, the computer determines a minimum subset of the unlabeled examples that are most informative for a maximum number of the classifiers to form an active set for learning. At block 1150, the computer receives the active set of examples as labeled by editors into multiple categories of the taxonomy. At block 1160, the computer uses the editorially-labeled examples of the active set to retrain the classifiers, thereby improving the accuracy of at least some of the classifiers. As mentioned, this method may be used for each of a plurality of score buckets $q_i$ for a group of sampled examples, each bucket including a constraint as explained with reference to FIG. 10.

Figure 12:
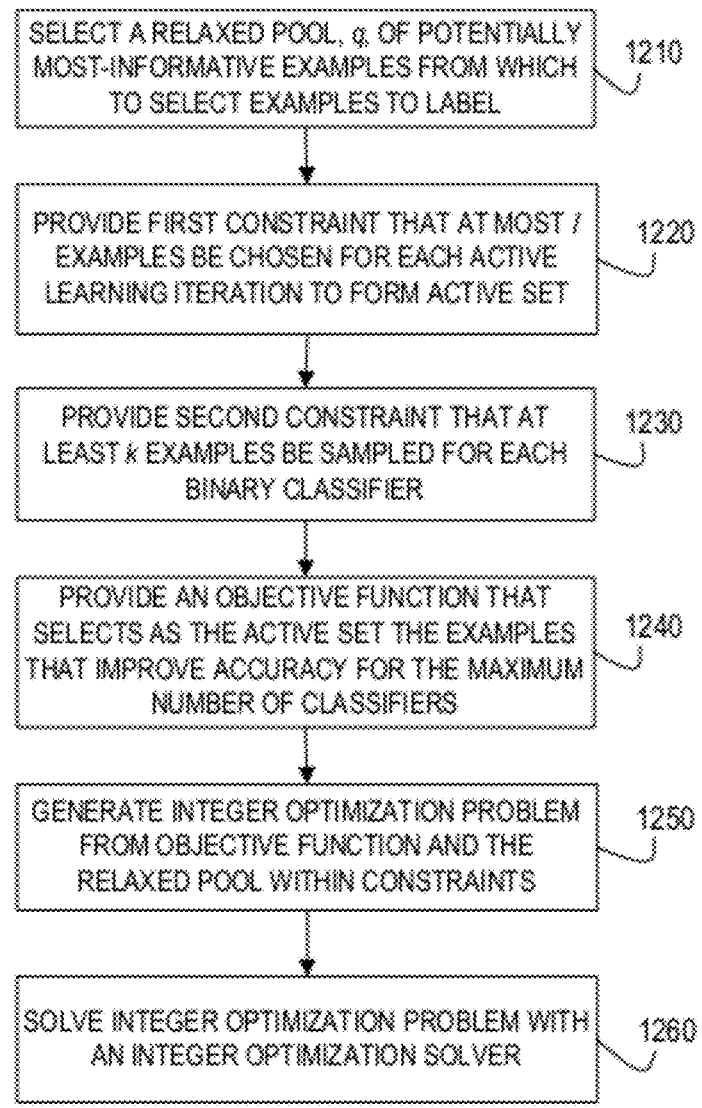
FIG. 12 is a flow chart of a second exemplary method, executable for each active learning iteration of the method of FIG. 11.

FIG. 12 is a flow chart of a second exemplary method, executable for each active learning iteration of the method of FIG. 11, the method executable by the computer 110 having a processor. To execute the method, the computer 110, at block 1210, selects a relaxed pool, q, of potentially most-informative examples from which to select examples to label for each of the m binary classifiers. At block 1220, the computer provides a first constraint that at most l examples be chosen for each active learning iteration to form the active set, where l is derived from editor bandwidth. At block 1230, the computer provides as a second constraint that at least k examples be sampled for each binary classifier. At block 1240, the computer provides an objective function that selects as the active set the examples that improve classification accuracy for the maximum number of the classifiers. At block 1250, the computer generates an integer optimization problem from the objective function and the relaxed pool within the first and second constraints. And, at block 1260, the computer solves the integer optimization problem with an integer programming solver.

Figure 13:
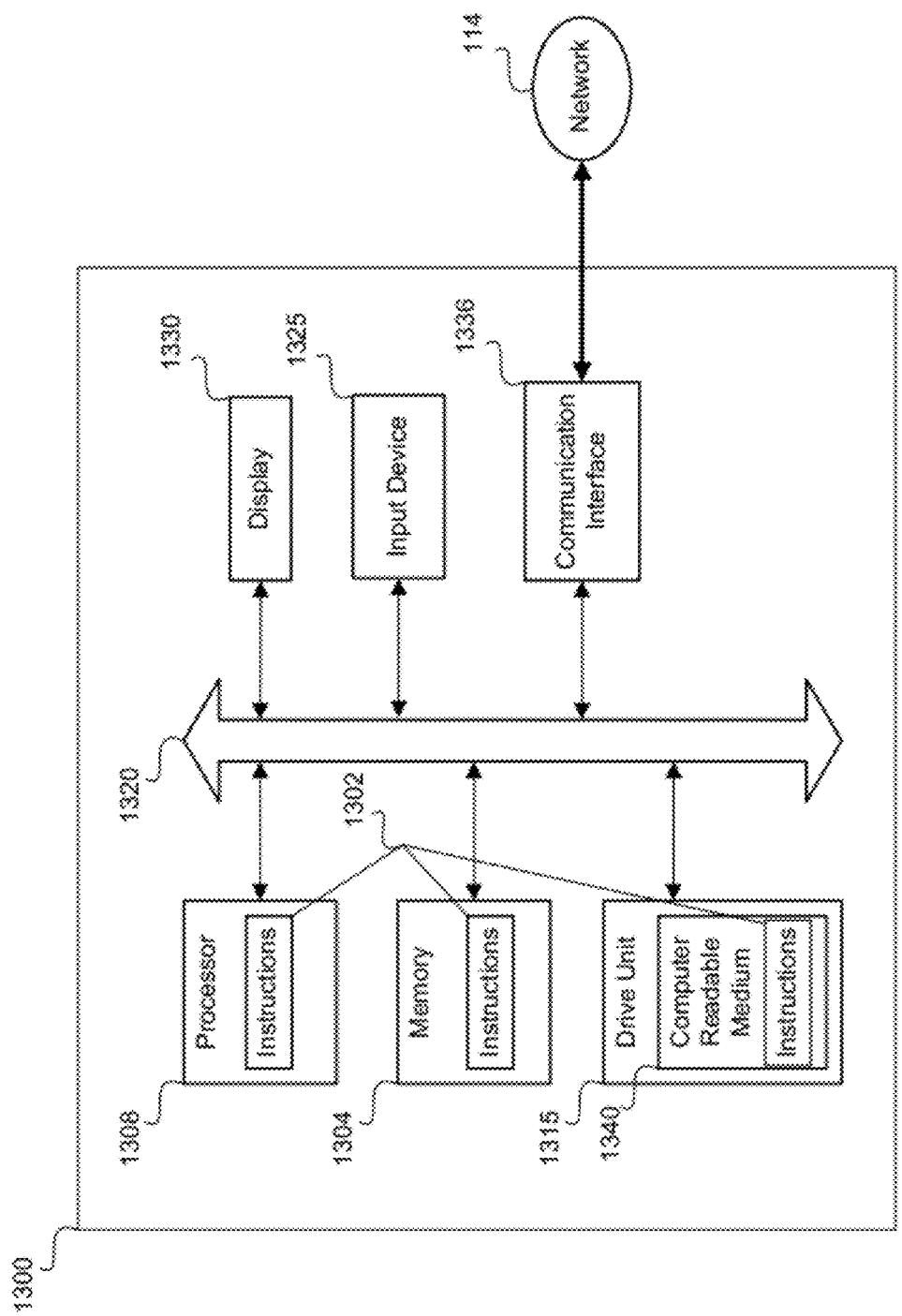
FIG. 13 illustrates a general computer system, which may represent any of the computing devices referenced herein.

FIG. 13 illustrates a general computer system 1300, which may represent the data center 102, the training/testing computer 110, or any other computing devices referenced herein or that may be executed by the system 100. The computer system 1300 may include an ordered listing of a set of instructions 1302 that may be executed to cause the computer system 1300 to perform any one or more of the methods or computer-based functions disclosed herein. The computer system 1300 may operate as a stand-alone device or may be connected, e.g., using the network 114, to other computer systems or peripheral devices.

In a networked deployment, the computer system 1300 may operate in the capacity of a server or as a client-user computer in a server-client user network environment, or as a peer computer system in a peer-to-peer (or distributed) network environment. The computer system 1300 may also be implemented as or incorporated into various devices, such as a personal computer or a mobile computing device capable of executing a set of instructions 1302 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 1300 may include a memory 1304 on a bus 1320 for communicating information. Code operable to cause the computer system to perform any of the acts or operations described herein may be stored in the memory 1304. The memory 1304 may be a random-access memory, read-only memory, programmable memory, hard disk drive or any other type of volatile or non-volatile memory or storage device.

The computer system 1300 may include a processor 1308, such as a central processing unit (CPU) and/or a graphics processing unit (GPU). The processor 1308 may include one or more general processors, digital signal processors, application specific integrated circuits, field programmable gate arrays, digital circuits, optical circuits, analog circuits, combinations thereof, or other now known or later-developed devices for analyzing and processing data. The processor 808 may implement the set of instructions 1302 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1300 may also include a disk or optical drive unit 1315. The disk drive unit 1315 may include a computer-readable medium 1340 in which one or more sets of instructions 1302, e.g., software, can be embedded. Further, the instructions 1302 may perform one or more of the operations as described herein. The instructions 1302 may reside completely, or at least partially, within the memory 1304 and/or within the processor 1308 during execution by the computer system 1300. Accordingly, the databases 104 and 124 described above in FIG. 1 may be stored in the memory 1304 and/or the disk unit 1315.

The memory 1304 and the processor 1308 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1300 may include an input device 1325, such as a keyboard or mouse, configured for a user to interact with any of the components of system 1300. It may further include a display 1330, such as a liquid crystal display (LCD), a cathode ray tube (CRT), or any other display suitable for conveying information. The display 1330 may act as an interface for the user to see the functioning of the processor 1308, or specifically as an interface with the software stored in the memory 1304 or the drive unit 1315.

The computer system 1300 may include a communication interface 1336 that enables communications via the communications network 114. The network 114 may include wired networks, wireless networks, or combinations thereof. The communication interface 1336 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown above, the system serving advertisements and interfaces that convey additional information related to the advertisement. For example, the system generates browser code operable by a browser to cause the browser to display a web page of information that includes an advertisement. The advertisement may include a graphical indicator that indicates that the advertisement is associated with an interface that conveys additional information associated with the advertisement. The browser code is operable to cause the browser to detect a selection of the graphical indicator, and display the interface along with the information displayed on the web page in response to the selection of the graphical indicator. The advertisement and the additional information conveyed via the interface are submitted by an advertiser during an advertisement submission time.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method for training classifiers in multiple categories through an active learning system, the method executable by a computer having a processor and memory, the method comprising:

training, by the processor, an initial set of m binary one-versus-all classifiers, one for each category in a taxonomy, on a labeled dataset of examples stored in a database coupled with the computer;

uniformly sampling, by the processor, up to a predetermined number of examples from a second, larger dataset of unlabeled examples stored in a database coupled with the computer;

ordering, by the processor, the sampled unlabeled examples in order of informativeness for each classifier;

determining, by the processor, a minimum subset of the unlabeled examples that are most informative for a maximum number of the classifiers to form an active set for learning;

where for each iteration of active learning, the processor selecting a pool, q, of potentially most-informative examples from which to select examples to label for each of the m binary classifiers;

providing a first constraint that at most $l$ examples be chosen for to form the active set, where $l$ is derived from editor bandwidth;

providing as a second constraint that at least k examples be sampled for each binary classifier;

providing an objective function that selects as the active set the examples that improve classification accuracy for the maximum number of the classifiers;

generating an integer optimization problem from the objective function and the pool within the first and second constraints; and solving the integer optimization problem with an integer programming solver; and using, by the processor, editorially-labeled versions of the examples of the active set to re-train the classifiers, thereby improving the accuracy of at least some of the classifiers.

2. The method of claim 1, further comprising:

receiving, by the computer, the active set of examples as labeled by editors into multiple categories of the taxonomy.

3. The method of claim 1, further comprising: enabling the integer optimization problem to set a different number of k examples for the second constraint for at least some of the m binary classifiers by weighting k in the classifiers in accordance with one or more business rules.

4. The method of claim 1, further comprising:
selecting the size q of the pool by first solving the objective function for q=k to obtain value v;
progressively increasing q in one or more steps to obtain a new objective function value, Vnew; and
using the value of q whose corresponding value Vnew is within user-specified thresholds of v.

5. The method of claim 1, where the number of categories is larger than the number of examples allowed to be labeled per iteration, the method further comprising:
relaxing some of the second constraints of corresponding classifiers by introducing m binary slack variables; and
solving the integer optimization problem using a penalty vector to penalize the objective function when one or more second constraints for corresponding classifiers cannot be satisfied.

6. The method of claim 5, further comprising, once a solution is identified by the objective function subject to one or more constraints of each category:
identifying variables that appear only in a single constraint for a classifier, where the single-constraint variables are those used to satisfy the single constraint and that do not contribute to satisfying the remaining constraints for other classifiers;
substituting the single-constraint variables with corresponding topmost-informative single-constraint variables from the pool for the corresponding classifier; and
sending to editors for labeling the examples that correspond to the identified variables.

7. A system for training classifiers in multiple categories through an active learning system, the system comprising:
a computer having a memory and a processor, the processor programmed to:
train an initial set of m binary one-versus-all classifiers, one for each category in a taxonomy, on a labeled dataset of examples stored in a database coupled with the computer;
uniformly sample up to a predetermined number of examples from a second, larger dataset of unlabeled examples stored in a database coupled with the computer;
order the sampled unlabeled examples in order of informativeness for each classifier;
determine a minimum subset of the unlabeled examples that are most informative for a maximum number of the classifiers to form an active set for learning;
where for each active learning iteration, the processor programmed to:
select a pool, q, of potentially most-informative examples from which to select examples to label for each of the m binary classifiers;
provide a first constraint that at most / examples be chosen to form the active set, where / is derived from editor bandwidth;
provide as a second constraint that at least k examples be sampled for each binary classifier;
provide an objective function that selects as the active set the examples that improve classification accuracy for the maximum number of the classifiers;
generate an integer optimization problem from the objective function and the pool within the first and second constraints; and
solve the integer optimization problem with an integer programming solver; and
use editorially-labeled versions of the examples of the active set to re-train the classifiers, thereby improving the accuracy of at least some of the classifiers.

8. The system of claim 7, where the processor is further programmed to receive the active set of examples as labeled by editors into multiple categories of the taxonomy.

9. The system of claim 7, where the processor is further programmed to enable the integer optimization problem to set a different number of k examples for the second constraint for at least some of the m binary classifiers by weighting k in the classifiers in accordance with one or more business rules.

10. The system of claim 7, where the processor is further programmed to:
select the size q of the pool by first solving the objective function for q=k to obtain value v;
progressively increase q in one or more steps to obtain a new objective function value, Vnew; and
use the value of q whose corresponding value Vnew. is within user-specified thresholds of v.

11. The system of claim 7, where the number of categories is larger than the number of examples allowed to be labeled per iteration, the processor further programmed to:
relax some of the second constraints of corresponding classifiers by introducing m binary slack variables; and
solve the integer optimization problem using a penalty vector to penalize the objective function when one or more second constraints for corresponding classifiers cannot be satisfied.

12. The system of claim 11, where once a solution is identified by the objective function subject to one or more constraints of each category, further comprising the processor programmed to:
identify variables that appear only in a single constraint for a classifier, where the single-constraint variables are those used to satisfy the single constraint and that do not contribute to satisfying the remaining constraints for other classifiers;
substitute the single-constraint variables with corresponding topmost-informative single-constraint variables from the pool for the corresponding classifier; and
send to editors for labeling the examples that correspond to the identified variable.

13. A non-transitory computer-readable medium comprising a set of instructions for training classifiers in multiple categories through an active learning system, the set of instructions executable by a computer having a processor and memory, the computer-readable medium comprising:
instructions to direct the processor to train an initial set of m binary one-versus-all classifiers, one for each category in a taxonomy, on a labeled dataset of examples stored in a database coupled with the computer;
instructions to direct the processor to uniformly sample up to a predetermined number of examples from a second, larger dataset of unlabeled examples stored in a database coupled with the computer;
instructions to direct the processor to order the sampled unlabeled examples in order of informativeness for each classifier;
instructions to direct the processor to determine a minimum subset of the unlabeled examples that are most informative for a maximum number of the classifiers to form an active set for learning;
where for each learning iteration, instructions to direct the processor to:

select a pool, q, of potentially most-informative examples from which to select examples to label for each of the m binary classifiers;

provide a first constraint that at most *l* examples be chosen for each active learning iteration to form the active set, where *l* is derived from editor bandwidth:

provide as a second constraint that at least k examples be sampled for each binary classifier;

provide an objective function that selects as the active set the examples that improve classification accuracy for the maximum number of the classifiers;

generate an integer optimization problem from the objective function and the pool within the first and second constraints; and solve the integer optimization problem with an integer programming solver; and instructions to direct the processor to use editorially-labeled versions of the examples of the active set to retrain the classifiers in response to receipt of the labeled examples from editors, thereby improving the accuracy of at least some of the classifiers.

14. The computer-readable medium of claim 13, further comprising instructions to direct the processor to enabling the integer optimization problem to set a different number of k examples for the second constraint for at least some of the m binary classifiers by weighting k in the classifiers in accordance with one or more business rules.

15. The computer-readable medium of claim 13, further comprising instructions to direct the processor to:

select the size q of the pool by first solving the objective function for q=k to obtain value v;

progressively increase q in one or more steps to obtain a new objective function value, Vnew; and use the value of q whose corresponding value Vnew is within user-specified thresholds of v.

16. The computer-readable medium of claim 13, where the number of categories is larger than the number of examples allowed to be labeled per iteration, the computer readable medium further comprising instructions to direct the processor to:

relax some of the second constraints of corresponding classifiers by introducing m binary slack variables; and solve the integer optimization problem using a penalty vector to penalize the objective function when one or more second constraints for corresponding classifiers cannot be satisfied.

17. The computer-readable medium of claim 16, where once a solution is identified by the objective function subject to one or more constraints of each category, further comprising instructions to direct the processor to:

identify variables that appear only in a single constraint for a classifier, where the single-constraint variables are those used to satisfy the single constraint and that do not contribute to satisfying the remaining constraints for other classifiers;

substitute the single-constraint variables with corresponding topmost-informative single-constraint variables from the pool for the corresponding classifier; and send to editors for labeling the examples that correspond to the identified variable.

* * * * *